(12) United States Patent
Cho

(10) Patent No.: US 9,511,737 B2
(45) Date of Patent: Dec. 6, 2016

(54) CURTAIN AIRBAG APPARATUS

(71) Applicant: HYUNDAI MOBIS Co., Ltd., Yongin-si, Gyeonggi-do (KR)

(72) Inventor: Kwang Soo Cho, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/922,672

(22) Filed: Oct. 26, 2015

(65) Prior Publication Data

US 2016/0144819 A1 May 26, 2016

(30) Foreign Application Priority Data

Nov. 21, 2014 (KR) .................. 10-2014-0163774

(51) Int. Cl.
*B60R 21/232* (2011.01)
*B60R 21/213* (2011.01)
*B60R 21/217* (2011.01)
*B60R 21/262* (2011.01)

(52) U.S. Cl.
CPC .......... *B60R 21/232* (2013.01); *B60R 21/213* (2013.01); *B60R 21/2171* (2013.01); *B60R 21/262* (2013.01)

(58) Field of Classification Search
CPC ... B60R 21/232; B60R 21/2171; B60R 21/262
See application file for complete search history.

(56) References Cited

U.S. PATENT DOCUMENTS

| | | | | |
|---|---|---|---|---|
| 7,213,839 | B2* | 5/2007 | Lockwood | B60R 21/233 280/743.2 |
| 8,007,000 | B2* | 8/2011 | Gammill | B60R 21/232 280/730.2 |
| 8,505,963 | B1* | 8/2013 | Lewis | B60R 21/2171 280/728.2 |
| 8,556,290 | B2* | 10/2013 | Fischer | B60R 21/213 280/728.2 |
| 8,622,423 | B1* | 1/2014 | Manire | B60R 21/2171 280/730.2 |
| 8,820,779 | B1* | 9/2014 | Low | B60R 21/232 280/728.2 |
| 2003/0090093 | A1* | 5/2003 | Ikeda | B60R 21/232 280/730.2 |
| 2003/0132615 | A1* | 7/2003 | Henderson | B60R 21/217 280/728.3 |
| 2005/0134022 | A1* | 6/2005 | Noguchi | B60R 21/2171 280/728.2 |
| 2011/0049848 | A1* | 3/2011 | Walston | B60R 21/2171 280/730.2 |
| 2011/0163521 | A1* | 7/2011 | Gammill | B60R 21/232 280/728.2 |

* cited by examiner

*Primary Examiner* — Drew Brown
(74) *Attorney, Agent, or Firm* — Paratus Law Group, PLLC

(57) ABSTRACT

Provided is a curtain airbag apparatus in which an airbag and an inflator are securely coupled to each other. To this end, according to the curtain airbag apparatus according to an exemplary embodiment of the present invention, an insertion portion of an anti-withdrawal member, together with a tip portion of the inflator, is inserted into a gas inlet unit of the airbag, and a clamp couples the insertion portion and the tip portion of the inflator to the gas inlet unit.

13 Claims, 4 Drawing Sheets

CURTAIN AIRBAG APPARATUS

CROSS-REFERENCE TO RELATED APPLICATIONS

The present application claims priority to Korean Patent Application Number 10-2014-0163774 filed Nov. 21, 2014, the entire contents of which the application is incorporated herein for all purposes by this reference.

TECHNICAL FIELD

The present invention relates to a curtain airbag apparatus, and more particularly, to a curtain airbag apparatus that is installed to be elongated in a front and rear direction of a vehicle.

BACKGROUND

In general, curtain airbag apparatuses are installed at left and right sides of a vehicle, respectively. In more detail, the curtain airbag apparatus is installed on a side inner panel, which is disposed at an upper side of a lateral side of the vehicle, so as to be elongated in a front and rear direction of the vehicle.

In the case of the curtain airbag apparatus, an airbag is deployed from the upper side to the lower side at the time of an accident of the vehicle, and disposed between a door of the vehicle and a head of an occupant to protect the head of the occupant.

The curtain airbag apparatus includes an inflator which generates gas, and the airbag which is coupled to the inflator and inflated and deployed when gas flows into the airbag. A gas inlet unit, which is coupled to the inflator, is formed at an upper end of the airbag. A tip portion of the inflator is inserted into the gas inlet unit, and then an outer circumferential surface of the gas inlet unit is surrounded by a clamp such that the inflator is coupled to the gas inlet unit.

However, in a case in which coupling force of the clamp is small, there is a problem in that the airbag and the inflator are separated from each other by pressure of the gas that is discharged into the gas inlet unit from the inflator at the time of a vehicle accident.

SUMMARY

The present invention has been made in an effort to provide a curtain airbag apparatus in which an airbag and an inflator are securely coupled to each other.

Technical problems of the present invention are not limited to the aforementioned technical problem, and other technical problems, which are not mentioned above, may be clearly understood by those skilled in the art from the following descriptions.

An exemplary embodiment of the present invention provides a curtain airbag apparatus including: an airbag which is inflated when gas flows into the airbag, and has a gas inlet unit through which gas flows in; an inflator which has a tip portion inserted into the gas inlet unit and generates gas; an anti-withdrawal member which has an insertion portion that is inserted into the gas inlet unit; and a clamp which is coupled to an outer surface of the gas inlet unit to couple the tip portion of the inflator and the insertion portion to the gas inlet unit.

Other detailed matters of the exemplary embodiment are included in the detailed description and the drawings.

According to the curtain airbag apparatus according to the exemplary embodiment of the present invention, since the insertion portion of the anti-withdrawal member, together with the tip portion of the inflator, is inserted into the gas inlet unit of the airbag and the clamp couples the insertion portion and the tip portion of the inflator to the gas inlet unit, the inflator is securely coupled to the gas inlet unit, thereby preventing the airbag and the inflator from being separated from each other due to pressure of the gas that is discharged into the gas inlet unit by the inflator at the time of an accident of the vehicle.

The effect of the present invention is not limited to the aforementioned effect, and other effects, which are not mentioned above, will be clearly understood by those skilled in the art from the claims.

DETAILED DESCRIPTION

Figure 1:
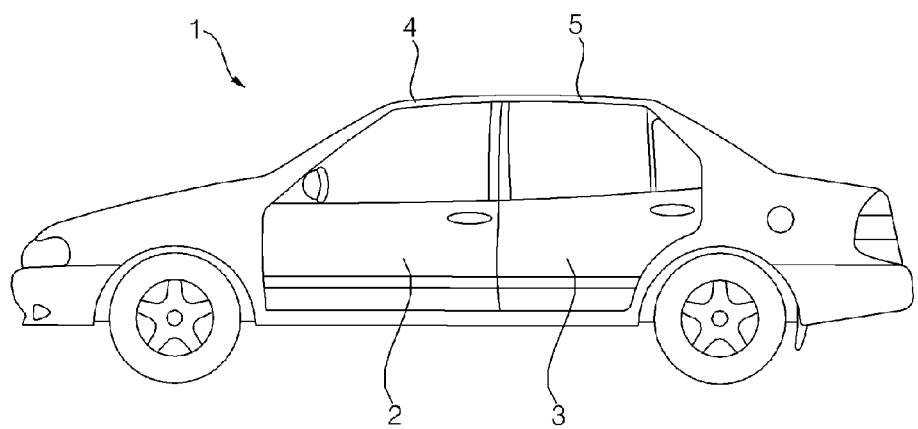
FIG. 1 is a side view illustrating a vehicle in which a curtain airbag apparatus according to an exemplary embodiment of the present invention is installed.

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, a curtain airbag apparatus according to an exemplary embodiment of the present invention will be described with reference to the drawings.

Figure 2:
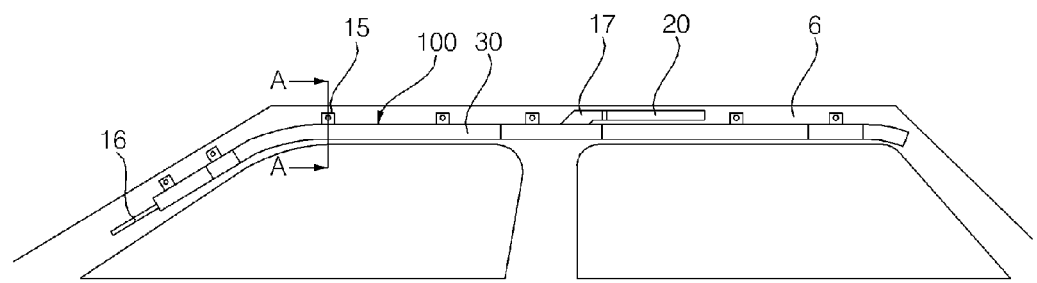
FIG. 2 is a view illustrating a state in which the curtain airbag apparatus according to the exemplary embodiment of the present invention is installed in the vehicle.
Figure 3:
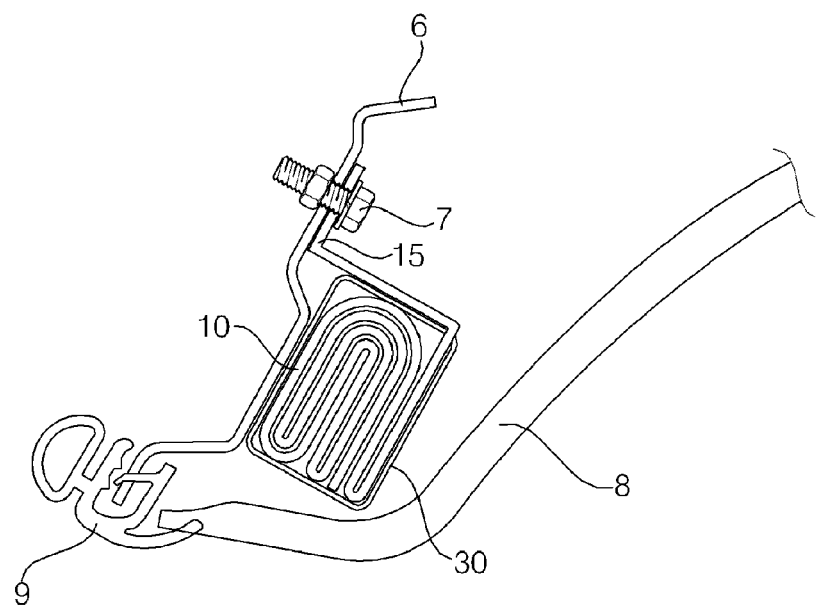
FIG. 3 is a cross-sectional view taken along line A-A of FIG. 2.
Figure 4:
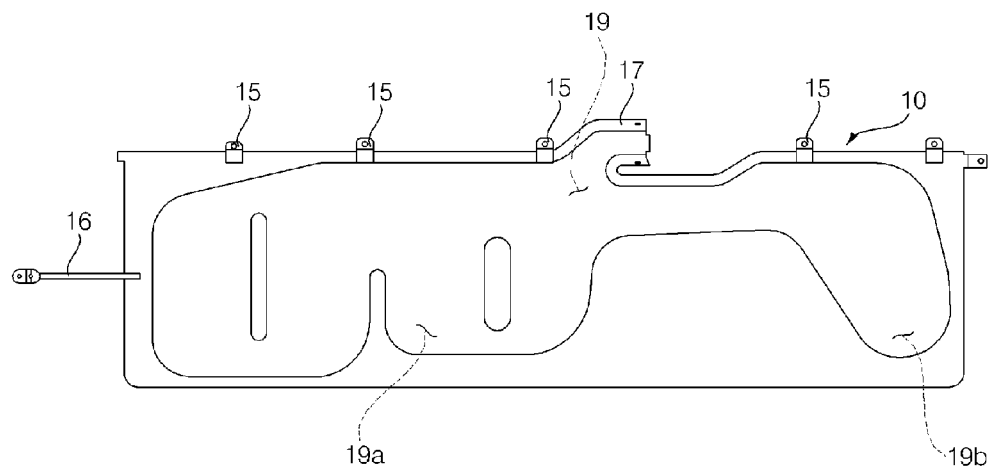
FIG. 4 is a side view of an airbag of the curtain airbag apparatus according to the exemplary embodiment of the present invention.

FIG. 1 is a side view illustrating a vehicle in which a curtain airbag apparatus according to an exemplary embodiment of the present invention is installed, FIG. 2 is a view illustrating a state in which the curtain airbag apparatus according to the exemplary embodiment of the present invention is installed in the vehicle, FIG. 3 is a cross-sectional view taken along line A-A of FIG. 2, and FIG. 4 is a side view of an airbag of the curtain airbag apparatus according to the exemplary embodiment of the present invention.

Referring to FIGS. 1 to 4, a curtain airbag apparatus 100 according to an exemplary embodiment of the present invention is mounted at an upper side of a vehicle 1 so as to be elongated in a front and rear direction.

A front door 2 and a rear door 3, through which occupants (including both a driver and a passenger) get in and out of the vehicle 1, are provided at a lateral side of the vehicle 1. An A-pillar 4 is disposed at an upper side of the front door 2, a C-pillar 5 is disposed at an upper side of the rear door 3, and a B-pillar (not illustrated) is disposed between the front door 2 and the rear door 3 so as to be elongated in an up and down direction.

The curtain airbag apparatus 100 is mounted on a side inner panel 6, which is disposed inside the A-pillar 4 and the C-pillar 5, so as to be elongated in the front and rear direction. Hereinafter, the side inner panel 6 will be described as a vehicle body 6.

The curtain airbag apparatus 100 includes an inflator 20 which generates gas, and an airbag 10 which is connected with the inflator 20 and inflated and deployed when gas generated by the inflator 20 flows into the airbag 10, to protect a head of the occupant.

The airbag 10 is folded and then encapsulated in a cushion cover 30, and then is mounted on the vehicle body 6, which is disposed inside the A-pillar 4 and the C-pillar 5, by fastening members 7. A plurality of mounting tabs 15, which is mounted on the vehicle body 6 by the fastening members 7, is formed at an upper end of the airbag 10.

The cushion cover 30 may be made of a flexible fabric material identical to a material of the airbag 10. Holes (not illustrated) through which the mounting tabs 15 come out are formed at an upper side of the cushion cover 30, such that the mounting tabs 15 come out through the holes to the outside of the cushion cover 30, and then are mounted on the vehicle body 6 through the fastening members 7. In addition, a tear line (not illustrated), which is torn by expansive force of the airbag 10, is formed at a lower side of the cushion cover 30. That is, the airbag 10 may tear the tear line while being inflated, and then the airbag 10 may be deployed while coming out to the outside of the cushion cover 30.

The curtain airbag apparatus 100 is covered by a head liner 8 such that the curtain airbag apparatus 100 is invisible from the interior of the vehicle. Here, the head liner 8 refers to a member that is made of a fabric material and covers a roof panel (not illustrated) of the vehicle 1 from the interior of the vehicle. The head liner 8 is caught by a weather strip 9 disposed at a lower end of the vehicle body 6, and when the airbag 10 is inflated, the head liner 8 is detached and separated from the weather strip 9 by expansive force of the airbag 10, and the airbag 10 comes out through a gap between the weather strip 9 and the head liner 8 and then is deployed, such that the airbag 10 is disposed between the head of the occupant and the front door 2 and the rear door 3, thereby protecting the head of the occupant.

An A-pillar tether 16, which is fixed to the vehicle body 6 disposed inside the A-pillar 4, is coupled to a front end of the airbag 10. Therefore, a front side of the airbag 10 is restricted by the A-pillar tether 16 when the airbag 10 is inflated, such that the airbag 10 may be deployed without being biased rearward.

Meanwhile, a gas inlet unit 17, which is coupled to the inflator 20, is formed at a center of an upper end of the airbag 10. A tip portion of the inflator 20, through which gas is discharged, is disposed to be inserted into the gas inlet unit 17. The airbag 10 is inflated and deployed when gas generated by the inflator 20 flows into a chamber 19 of the airbag 10 through the gas inlet unit 17.

The chamber 19 includes a front chamber 19a disposed at a front side based on the gas inlet unit 17 that is a center in the front and rear direction of the airbag 10, and a rear chamber 19b disposed at a rear side based on the gas inlet unit 17. The front chamber 19a is an area for protecting an occupant seated in a front seat, and the rear chamber 19b is an area for protecting an occupant seated in a rear seat.

Figure 5:
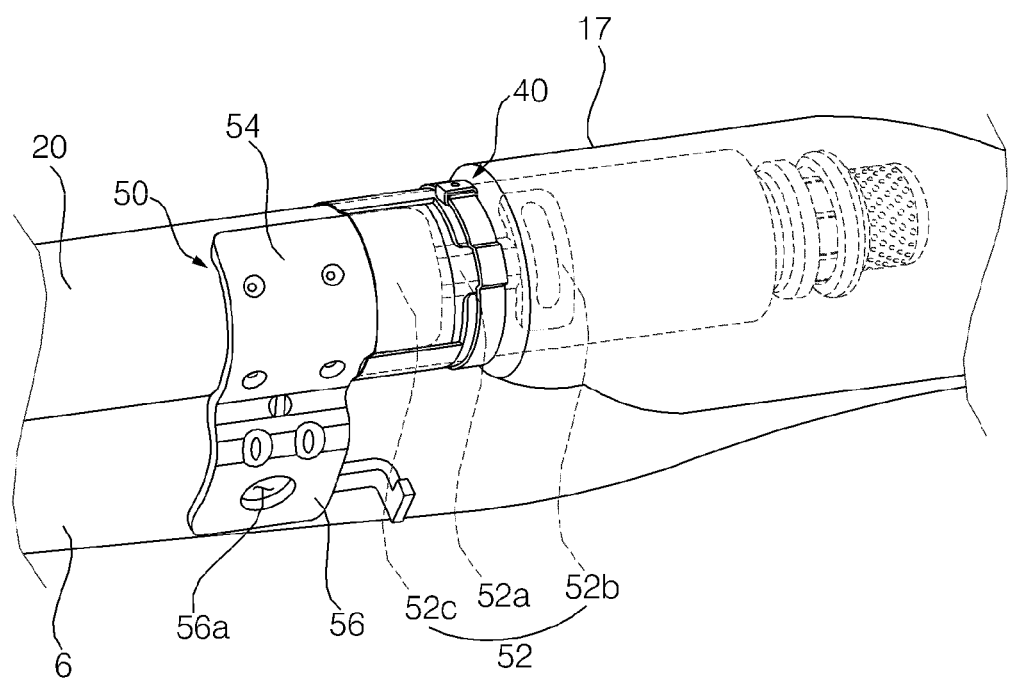
FIG. 5 is a view illustrating a state in which an inflator is coupled to a gas inlet unit of the airbag.
Figure 6:
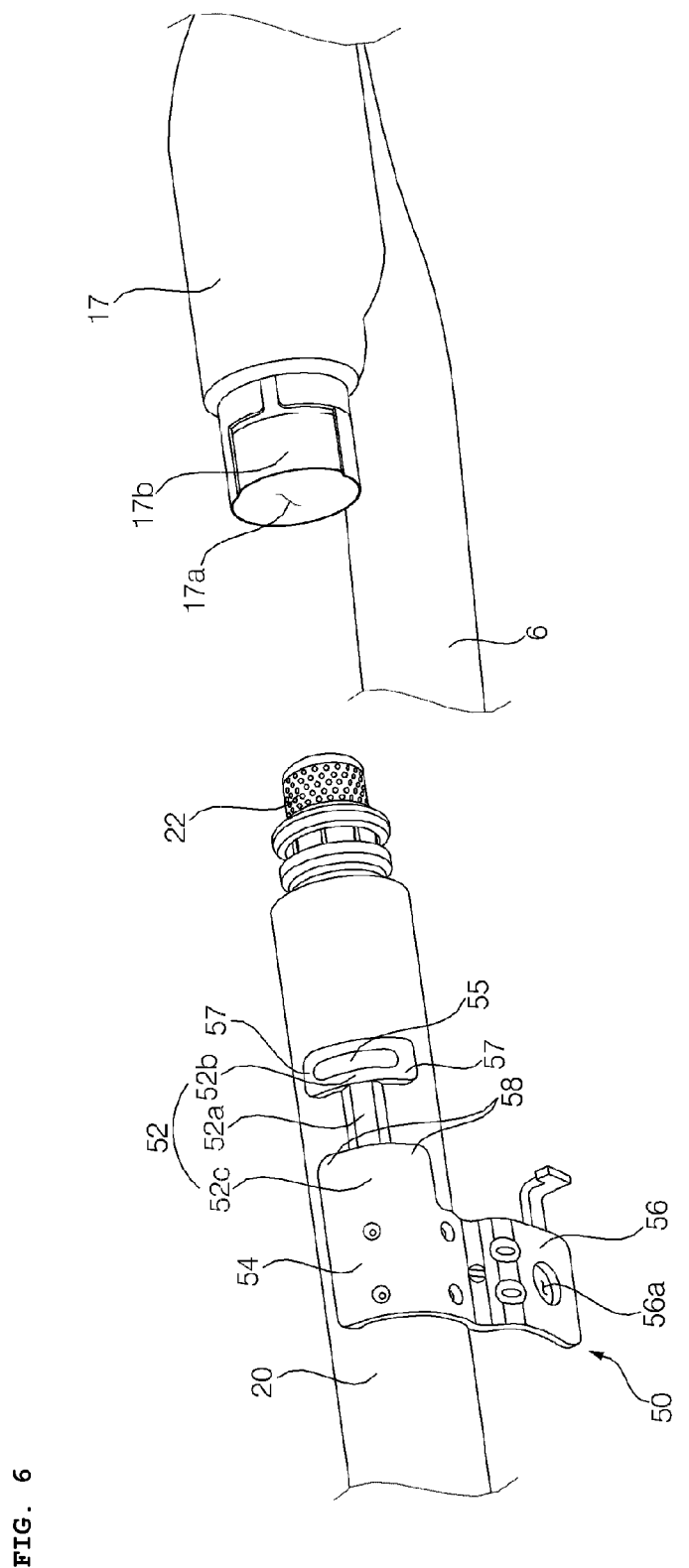
FIG. 6 is a view illustrating a state before the inflator is coupled to the gas inlet unit of the airbag.

FIG. 5 is a view illustrating a state in which the inflator is coupled to the gas inlet unit of the airbag, and FIG. 6 is a view illustrating a state before the inflator is coupled to the gas inlet unit of the airbag.

Referring to FIGS. 5 and 6, gas discharge ports 22 through which gas is discharged are formed at a tip of the inflator 20. In order to allow gas discharged through the gas discharge ports 22 to flow into the airbag 10, the tip portion of the inflator 20 is inserted into and coupled to the gas inlet unit 17 formed at the upper end of the airbag 10.

An insertion port 17a into which the tip portion of the inflator 20 is inserted is formed at a rear side of the gas inlet unit 17. The insertion port 17a is in communication with the chamber 19 of the airbag 10. The tip portion of the inflator is inserted into the insertion port 17a formed in the gas inlet unit 17, and then an outer circumferential surface of the gas inlet unit 17 is surrounded by a clamp 40, such that the tip portion of the inflator 20 may be coupled to the gas inlet unit 17. However, in the present exemplary embodiment, when the tip portion of the inflator 20 is inserted into the gas inlet unit 17, an insertion portion 52 of an anti-withdrawal member 50, together with the tip portion of the inflator 20, is inserted into the gas inlet unit 17, the outer circumferential surface of the gas inlet unit 17 is surrounded by the clamp 40, and the clamp 40 is coupled to an outer surface of the gas inlet unit 17.

Accordingly, the clamp 40 securely couples the tip portion of the inflator 20 and the insertion portion 52 to the gas inlet unit 17. Therefore, it is possible to prevent the inflator 20 from being withdrawn from the gas inlet unit 17 due to pressure of the gas that is discharged into the gas inlet unit 17 by the inflator 20 at the time of a vehicle accident.

The anti-withdrawal member 50 is coupled to an outer surface of the inflator 20, and only the insertion portion 52 is inserted into the gas inlet unit 17. In a state in which the tip portion of the inflator 20 and the insertion portion 52 are inserted into the gas inlet unit 17, the insertion portion 52 is disposed between the tip portion of the inflator 20 and the gas inlet unit 17. The anti-withdrawal member 50 has a coupling portion 54 coupled to the outer surface of the inflator 20. The coupling portion 54 extends rearward from the insertion portion 52, and is disposed outside the gas inlet unit 17. The coupling portion 54 may be coupled to the inflator 20 by welding. Of course, the coupling portion 54 may be coupled to the inflator 20 by a clamp.

The coupling portion 54 may be formed to have a curved surface corresponding to the circumferential surface of the inflator 20 so that the coupling portion 54 may be in close contact with the inflator 20. In addition, the insertion portion 52 may also be formed to have a curved surface corresponding to the circumferential surface of the inflator 20 so that the insertion portion 52 may be in close contact with the inflator 20.

The insertion portion 52 includes a first insertion portion 52a, and a second insertion portion 52b. The first insertion portion 52a extends forward from the coupling portion 54, and is pressed by the clamp 40. The second insertion portion 52b extends forward from the first insertion portion 52a, and is disposed further forward than the clamp 40.

When the inflator 20 is about to be withdrawn rearward from the gas inlet unit 17, the second insertion portion 52b needs to be caught by the clamp 40 to prevent the inflator 20 from being withdrawn rearward from the gas inlet unit 17. To this end, the second insertion portion 52b is formed to have a wider width in a circumferential direction of the inflator 20 than the first insertion portion 52*a*, and a first protruding portions 57, which further protrudes from the first insertion portion 52*a*, is formed at least one side of the second insertion portion 52*b*. In the present exemplary embodiment, the first protruding portions 57 are formed at both sides of the second insertion portion 52*b*, respectively. Therefore, when the inflator 20 is about to be withdrawn rearward from the gas inlet unit 17, the first protruding portions 57 of the second insertion portion 52*b* are caught by the clamp 40 to prevent the inflator 20 from being withdrawn rearward from the gas inlet unit 17.

Of course, in order to allow the insertion portion 52 to be caught by the clamp 40 when the inflator 20 is about to be withdrawn rearward from the gas inlet unit 17, a rib 55, which protrudes at a position further forward than the clamp 40, may be formed on the insertion portion 52. In a case in which the rib 55 is formed on the insertion portion 52 as described above, the rib 55 is caught by the clamp 40 when the inflator 20 is about to be withdrawn rearward from the gas inlet unit 17, thereby preventing the inflator 20 from being withdrawn rearward from the gas inlet unit 17.

In the present exemplary embodiment, the rib 55 is formed on the second insertion portion 52*b* such that the first protruding portion 57 is caught by the clamp 40 when the inflator 20 is about to be withdrawn rearward from the gas inlet unit 17, and as a result, the second insertion portion 52*b* primarily prevents the inflator 20 from being withdrawn rearward from the gas inlet unit 17. Even though the first protruding portion 57 is moved rearward while passing over the clamp 40 due to excessive force that causes the inflator 20 to be withdrawn rearward from the gas inlet unit 17, the rib 55 is caught by the clamp 40, and as a result, the second insertion portion 52*b* may secondarily prevent the inflator 20 from being withdrawn rearward from the gas inlet unit 17.

The insertion portion 52 may further include a body portion 52*c* that connects the first insertion portion 52*a* and the coupling portion 54. The body portion 52*c* may be formed to have the same width in the circumferential direction of the inflator 20 as the second insertion portion 52*b*. In this case, the first insertion portion 52*a* may be formed by cutting out both lateral portions of the insertion portion 52.

The body portion 52*c* is formed to have a wider width in the circumferential direction of the inflator 20 than the first insertion portion 52*a*, such that a second protruding portion 58, which further protrudes from the first insertion portion 52*a*, is formed at least one side of the body portion 52*c*. In the present exemplary embodiment, the second protruding portions 58 are formed at both sides of the body portion 52*c*, respectively. When the inflator 20 is about to be withdrawn rearward from the gas inlet unit 17, the airbag 10 repeatedly moves forward and backward unevenly due to a flow of gas discharged from the inflator 20. When the airbag 10 moves forward and backward unevenly, the first protruding portions 57 of the second insertion portion 52*b* are caught by the clamp 40, and the second protruding portions 58 of the body portion 52*c* are caught by the clamp 40, such that the airbag 10 and the inflator 20 are not separated from each other.

Meanwhile, the anti-withdrawal member 50 further includes a mounting portion 56 mounted on the vehicle body 6. Therefore, it is not necessary to provide a separate bracket for mounting the inflator 20 on the vehicle body 6.

The mounting portion 56 has a fastening hole 56*a* for mounting the mounting portion 56 on the vehicle body 6. A fastening member such as a bolt is inserted into the fastening hole 56*a* to fasten the fastening member to the vehicle body 6, such that the mounting portion 56 may be mounted on the vehicle body 6.

Meanwhile, a recessed portion 17*b*, which has a portion that corresponds to the first insertion portion 52*a* and the body portion 52*c* and is recessed in a shape corresponding to the shapes of the first insertion portion 52*a* and the body portion 52*c*, is formed in the outer surface of the gas inlet unit 17. The airbag 10 is formed by coating a fabric with silicone. The recessed portion 17*b* may be formed by being coated with a smaller amount of silicone in comparison with the other portions except for the recessed portion 17*b*.

In a state in which the tip portion of the inflator 20 and the insertion portion 52 are inserted into the gas inlet unit 17, the recessed portion 17*b* protrudes in a radial direction of the gas inlet unit 17 to allow the outer circumferential surface of the gas inlet unit 17 to which the clamp 40 is fastened to become uniform. Therefore, the clamp 40 is securely coupled to the gas inlet unit 17, thereby preventing the tip portion of the inflator 20 and the insertion portion 52 from being withdrawn from the gas inlet unit 17.

As described above, according to the curtain airbag apparatus according to the exemplary embodiment of the present invention, since the insertion portion 52 of the anti-withdrawal member 50, together with the tip portion of the inflator 20, is inserted into the gas inlet unit 17 of the airbag 10 and the clamp 40 couples the insertion portion 52 and the tip portion of the inflator 20 to the gas inlet unit 17, the inflator 20 is securely coupled to the gas inlet unit 17, thereby preventing the airbag 10 and the inflator 20 from being separated from each other due to pressure of the gas that is discharged into the gas inlet unit 17 by the inflator 20 at the time of an accident of the vehicle 1.

It may be understood by a person skilled in the art that the present invention may be carried out in other specific forms without changing the technical spirit or the essential characteristics. Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning and the scope of the claims, and the equivalents thereto, are included in the scope of the present invention.

What is claimed is:

1. A curtain airbag apparatus comprising:
    an airbag which is inflated when gas flows into the airbag, and has a gas inlet unit through which the gas flows in;
    an inflator which has a tip portion inserted into the gas inlet unit and generates the gas;
    an anti-withdrawal member which has an insertion portion including:
        a first insertion portion positioned inside the gas inlet unit, and
        a second insertion portion extended from the first insertion portion, positioned inside the gas inlet unit, and having a width wider in a circumferential direction of the inflator than a width of the first insertion portion; and
    a clamp which is installed to press an outer surface of the gas inlet unit and the first insertion portion positioned under the pressed outer surface of the gas inlet unit to couple the tip portion of the inflator and the insertion portion to the gas inlet unit.

2. The curtain airbag apparatus of claim 1, wherein the anti-withdrawal member further includes a coupling portion that extends from the insertion portion to be disposed outside the gas inlet unit and is coupled to the inflator.

3. The curtain airbag apparatus of claim 1, wherein the second insertion portion further includes
a first protruding portion that further protrudes from at least one side of the second insertion portion.

4. The curtain airbag apparatus of claim 3, wherein the first protruding portions are formed at both sides of the second insertion portion, respectively.

5. The curtain airbag apparatus of claim 1, wherein a rib, which protrudes at a position further forward than the clamp, is formed on the insertion portion.

6. The curtain airbag apparatus of claim 3, wherein the anti-withdrawal member further includes a coupling portion that extends from the insertion portion to be disposed outside the gas inlet unit and is coupled to the inflator, and the insertion portion further includes a body portion that connects the first insertion portion and the coupling portion.

7. The curtain airbag apparatus of claim 6, wherein a second protruding portion, which further protrudes from the first insertion portion, is formed at least one side of the body portion.

8. The curtain airbag apparatus of claim 7, wherein the second protruding portions are formed at both sides of the body portion, respectively.

9. The curtain airbag apparatus of claim 6, wherein the body portion is formed to have the same width in a circumferential direction of the inflator as the second insertion portion.

10. The curtain airbag apparatus of claim 1, wherein the insertion portion is formed to have a curved surface corresponding to a circumferential surface of the inflator.

11. The curtain airbag apparatus of claim 1, wherein the anti-withdrawal member further includes a mounting portion mounted on a vehicle body.

12. The curtain airbag apparatus of claim 11, wherein the mounting portion has a fastening hole into which a fastening member for mounting the mounting portion on the vehicle body is inserted.

13. The curtain airbag apparatus of claim 6, wherein a recessed portion, which has a portion that corresponds to the first insertion portion and the body portion and is recessed in a shape corresponding to the shapes of the first insertion portion and the body portion, is formed in the outer surface of the gas inlet unit.

\* \* \* \* \*